(12) United States Patent
Cui et al.

(10) Patent No.: US 11,517,969 B2
(45) Date of Patent: Dec. 6, 2022

(54) WELD-BRAZING TECHNIQUES

(71) Applicant: General Electric Company, Schenectady, NY (US)

(72) Inventors: Yan Cui, Greer, SC (US); Michael Arnett, Greenville, SC (US); Matthew Laylock, Greenville, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 422 days.

(21) Appl. No.: 16/256,340

(22) Filed: Jan. 24, 2019

(65) Prior Publication Data
US 2020/0238415 A1    Jul. 30, 2020

(51) Int. Cl.
*B23K 1/00* (2006.01)
*B23K 1/19* (2006.01)
(Continued)

(52) U.S. Cl.
CPC .............. *B23K 1/0018* (2013.01); *B23K 1/19* (2013.01); *B23K 1/20* (2013.01); *B23P 6/045* (2013.01);
(Continued)

(58) Field of Classification Search
CPC .......... B23P 6/045; B23P 6/002; B23P 6/005; B23P 6/007; F05D 2230/237;
(Continued)

(56) References Cited

U.S. PATENT DOCUMENTS 6,589,600 B1 * 7/2003 Hasz .................. B22C 9/22
427/264
6,998,568 B2 * 2/2006 Brehm ............... B23K 1/0056
219/121.62
(Continued)

FOREIGN PATENT DOCUMENTS

DE  102014206146 A1 * 10/2015 ............. F01D 5/005
EP      2754528 A1      7/2014
JP    2012200761 A *  10/2012

OTHER PUBLICATIONS

PCT International Search Report and Written Opinion; Application No. PCT/US2020/014697; dated May 8, 2020; 12 pages.
(Continued)

*Primary Examiner* — Woody A Lee, Jr.
*Assistant Examiner* — Jesse M Prager
(74) *Attorney, Agent, or Firm* — Fletcher Yoder, P.C.

(57) ABSTRACT

A system includes a gas turbine component having a recessed portion with a recessed surface in a hard-to-weld (HTW) material. The system includes a plate disposed over the recessed portion. The plate has an easy-to-weld (ETW) material. The plate has an outer surface and an inner surface, and the inner surface faces the recessed portion. The system includes a braze material disposed within the recessed portion between the recessed surface and the inner surface of the plate. The braze material is configured to bond the recessed surface of the recessed portion with the inner surface of the plate when the braze material is heated to a brazing temperature. The system includes a filler material disposed on the outer surface of the plate disposed over the recessed portion. Application of the filler material to the outer surface of the plate is configured to heat the braze material to the brazing temperature.

15 Claims, 5 Drawing Sheets

(51) Int. Cl.
*B23P 6/04* (2006.01)
*B23K 35/24* (2006.01)
*B23K 101/00* (2006.01)
*B23K 1/20* (2006.01)
B23K 103/18 (2006.01)
B23K 103/10 (2006.01)

(52) U.S. Cl.
CPC ........ *B23K 35/24* (2013.01); *B23K 2101/001* (2018.08); *B23K 2103/10* (2018.08); *B23K 2103/18* (2018.08); *F05D 2230/233* (2013.01); *F05D 2230/234* (2013.01); *F05D 2230/235* (2013.01); *F05D 2230/237* (2013.01)

(58) Field of Classification Search
CPC ......... F05D 2230/233; F05D 2230/234; F05D 2230/235; F05D 2230/31; B23K 1/0018; B23K 2101/001; B23K 1/008; B23K 1/19; B23K 1/20; F01D 5/005
See application file for complete search history.

(56) References Cited

U.S. PATENT DOCUMENTS

| | | | | |
|---|---|---|---|---|
| 8,156,649 | B2* | 4/2012 | Hovel | B23K 1/0056 29/889.1 |
| 8,921,730 | B2 | 12/2014 | Cui et al. | |
| 2007/0160476 | A1* | 7/2007 | Cheng | F01D 5/005 416/193 A |
| 2008/0237195 | A1* | 10/2008 | Iwasa | F04D 29/026 219/61 |
| 2010/0059573 | A1 | 3/2010 | Kottilingam et al. | |
| 2010/0126014 | A1* | 5/2010 | Gupta | B23P 6/007 29/889.1 |
| 2012/0111928 | A1* | 5/2012 | Park | B23K 1/0018 228/245 |
| 2012/0272611 | A1* | 11/2012 | Tsukimoto | B23K 35/0244 52/741.1 |
| 2013/0323533 | A1 | 12/2013 | Cui et al. | |
| 2015/0090773 | A1* | 4/2015 | Schick | B23K 1/00 228/165 |
| 2016/0167172 | A1* | 6/2016 | Goncharov | B23K 1/0056 219/76.12 |
| 2017/0144260 | A1* | 5/2017 | Cui | B23K 1/0018 |
| 2017/0167263 | A1* | 6/2017 | Whims | B23K 35/0244 |
| 2017/0312867 | A1 | 11/2017 | Kuhlee et al. | |

OTHER PUBLICATIONS

Dupont, John N. et al., Welding Metallurgy and Weldability of Nickel-Base Alloys, 2009 John Wiley & Sons, Inc., Publication, Chapter 4, pp. 157-254.

Prager, et al., Welding Research Council Bulletin, United Engineering Center, Welding of Precipitation-Hardening Nickel-Base Alloys, Feb. 1968, pp. 1-63.

* cited by examiner

WELD-BRAZING TECHNIQUES

BACKGROUND

The subject matter disclosed herein relates to weld-brazing techniques, and more particularly to weld-brazing techniques for repairing defective gas turbine components of gas turbine engines.

Gas turbine components are subjected to high temperatures and stresses during operation. Gas turbine components may be formed of hard-to-weld materials. Mis-machined gas turbine components may have defects (e.g., recesses, grooves, or lack of material). Repair of the defects in the hard-to-weld materials of the gas turbine components may be costly and/or time consuming. Welding processes directly to the defect in the hard-to-weld material may be costly and/or difficult. Further, welding processes directly to the defect in the hard-to-weld material may negatively affect adjacent portions of the gas turbine component because the non-uniform heating and cooling during the welding process will generate thermal stress and residual stress. These stresses may result in hot cracking or strain age cracking during welding, after welding, or during post-weld heat treatment (PWHT). Brazing may be used with a vacuum furnace to heat the braze material used for the repair. However, vacuum furnaces may have limited space available for gas turbine components and may have extensive heating times for the brazing process to be completed. Further, heat treatment of the repaired gas turbine component after the vacuum furnace may further increase the cost and time to repair the gas turbine component.

BRIEF DESCRIPTION

In one embodiment, a system includes a gas turbine component having a recessed portion with a recessed surface in a hard-to-weld (HTW) material. The system includes a plate disposed over the recessed portion. The plate has an easy-to-weld (ETW) material. The plate has an outer surface and an inner surface, and the inner surface faces the recessed portion. The system includes a braze material disposed within the recessed portion between the recessed surface and the inner surface of the plate. The braze material is configured to bond the recessed surface of the recessed portion with the inner surface of the plate when the braze material is heated to a brazing temperature. The system includes a filler material disposed on the outer surface of the plate disposed over the recessed portion. Application of the filler material to the outer surface of the plate is configured to heat the braze material to the brazing temperature.

In another embodiment, A method includes the step of arranging a braze material on a recessed surface of a gas turbine component. Further, the method includes the step of disposing a plate on the braze material. An inner surface of the plate is proximate to the braze material, and the plate has an outer surface opposite the inner surface. Additionally, the method includes the step of heating a filler material to apply the filler material to the outer surface of the plate. Heat from applying the filler material is configured to heat the plate. Moreover, the method includes the step of bonding, via the heat from applying the filler material, the recessed surface of the gas turbine component to the inner surface of the plate with the braze material.

In a further embodiment, A system includes a gas turbine component for a gas turbine comprising a hard-to-weld material. The hard-to-weld material is a nickel based alloy. The system also includes a braze material comprising a bonding surface configured to contact a surface of the gas turbine component and a braze material interface surface disposed on a side of the braze material opposite the bonding surface. Further, the system includes a plate comprising a plate interface surface configured to contact the braze material interface surface. The plate interface surface has a larger surface area than the braze material interface surface. Additionally, the system includes a filler material disposed on a surface of the plate opposite the braze material. Moreover, a welding device is configured to apply the filler material to the surface of the plate opposite the braze material. The braze material is configured to melt in response to heat conducted through the plate to the braze material and bond the plate to the gas turbine component after curing.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
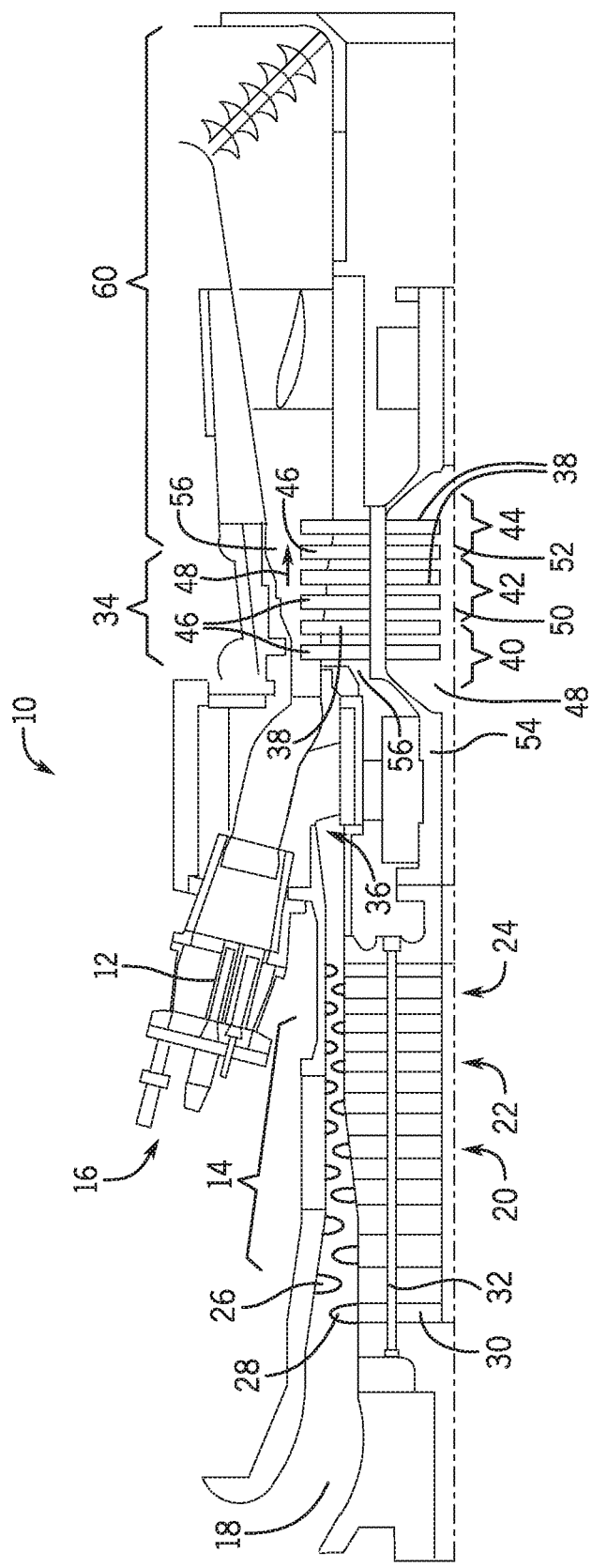
FIG. 1 is a cross-sectional view of an embodiment of a turbine system.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain applications, turbomachinery (e.g., turbines, compressors, and pumps) and other machinery may include components that operate in high heat environments. For example, certain turbine system components include blades, liners, rotor wheels, shafts, nozzles, and so forth. Some turbine components may have manufacturing defects (e.g., recesses, grooves, notches, etc.).

Generally, brazing may be used to restore components to operational condition. However, the brazing process may be costly and/or time consuming. For example, brazing may include using a furnace (e.g., vacuum furnace) during a brazing process. The furnace may have limited capacity to braze gas turbine components due to the size of the furnace and the size of the components. Additionally, the use of the furnace to braze the gas turbine components may have extensive heating times for the brazing process and/or have specialized operators. Additionally, furnaces heat portions of the gas turbine components in addition to the braze materials; thus, the whole repaired gas turbine component may be heat treated after brazing to restore desired material properties to the gas turbine component. Moreover, direct welding of the defect of the gas turbine component may not be effective for repairing defects in gas turbine components made of hard-to-weld material(s).

The weld-brazing techniques disclosed herein overcome current issues with brazing or welding gas turbine components. For example, the weld-brazing techniques may be used without specialized equipment (e.g., furnace) thereby reducing the costs, complexity, and/or repair times for the gas turbine components. Further, the heat applied to the gas turbine component itself by the weld-brazing techniques described herein may reduce or eliminate subsequent heat treatment of the gas turbine component, thereby reducing costs and repair times of the gas turbine component. Additionally, weld-brazing techniques may effectively repair gas turbine components having hard-to-weld materials. Thus, the weld-brazing techniques disclosed herein overcome current issues with brazing and welding of gas turbine components.

The weld-brazing techniques may also provide additional advantages over traditional brazing. Brazing may not be suitable for repairing load-bearing components. The braze material may not have desired mechanical properties (e.g., tensile strength, etc.) for load-bearing applications. Welding may be suitable for repairing load-bearing components; however, as described above, welding alone may not be effective for repairing hard-to-weld materials, such as those used in some gas turbine components. The weld-brazing techniques disclosed herein may effectively apply a material having desired load-bearing mechanical properties in addition to brazing materials. Thus, the weld-brazing techniques disclosed herein may provide more effective repair of load-bearing gas turbine components than brazing.

FIG. 1 is a cross-sectional view of an embodiment of a turbine system 10. During operation of the turbine system 10, a fuel such as natural gas or syngas, may be routed to the turbine system 10 through one or more fuel nozzles 12 into a combustor 16. Air may enter the turbine system 10 through an air intake section 18 and may be compressed by a compressor 14. The compressor 14 may include a series of stages 20, 22, and 24 that compress the air. Each stage may include one or more sets of stationary vanes 26 and blades 28 that rotate to progressively increase the pressure to provide compressed air. The blades 28 may be attached to rotating wheels 30 connected to a shaft 32. The compressed discharge air from the compressor 14 may exit the compressor 14 through a diffuser section 36 and may be directed into the combustor 16 to mix with the fuel. For example, the fuel nozzles 12 may inject a fuel-air mixture into the combustor 16 in a suitable ratio for optimal combustion, emissions, fuel consumption, and power output. In certain embodiments, the turbine system 10 may include multiple combustors 16 disposed in an annular arrangement. Each combustor 16 may direct hot combustion gases into a turbine 34.

The turbine 34 may include multiple includes three separate stages 40, 42, and 44 surrounded by a liner 56. Each stage 40, 42, and 44 includes a set of turbine blades or buckets 46 coupled to a respective rotor wheel 48, 50, and 52, which are attached to a shaft 54. Further, each stage may include a set of nozzles 38. Hot gases from the combustor 16 may be directed in a flow direction 48 through the turbine 34. As the hot combustion gases flowing through the turbine 34 cause rotation of turbine blades 46, the shaft 54 rotates to drive the compressor 14 and any other suitable load, such as an electrical generator. Eventually, the turbine system 10 diffuses and exhausts the combustion gases in the flow direction 48 through an exhaust section 60. Turbine components, such as the fuel nozzles 12, intake 18, compressor 14, stationary nozzles 26, blades 28, wheels 30, shaft 32, diffuser 36, stage 40, stage 42, and stage 44, turbine blades 46, nozzles 38, shaft 54, liner 56, and exhaust section 60, may use the disclosed embodiments to repair defects, cracks, or gaps, as described in more detail with respect to FIG. 2 below.

Figure 2:
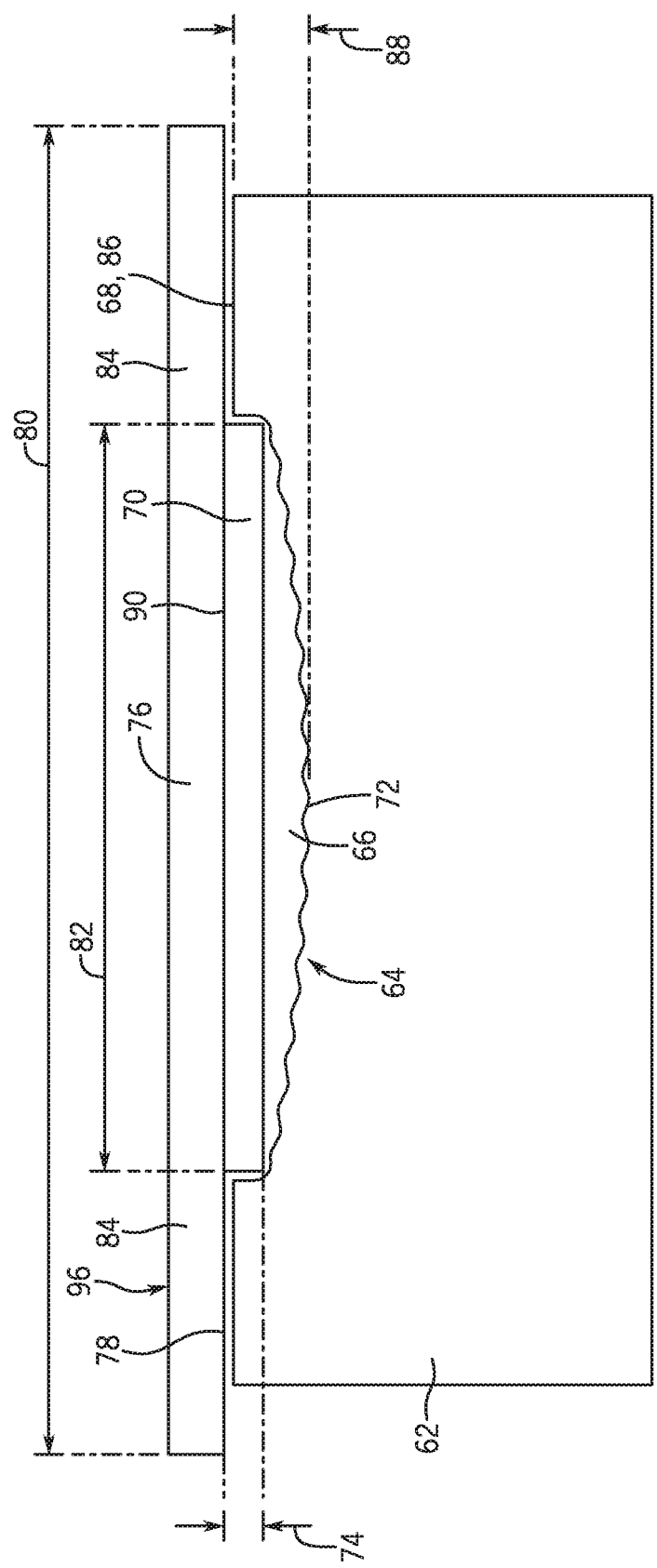
FIG. 2 is a cross-sectional view of an embodiment a gas turbine component having a surface defect.

FIG. 2 is a cross-sectional view of an embodiment of a gas turbine component 62 having an external defect 64. The gas turbine component 62 may be the nozzle 38 of the gas turbine of FIG. 1. However, the gas turbine component 62 may be another hot-gas component of the gas turbine system 10 (e.g., blades 46, diffusers 36, liners 56, etc.). In some embodiments, the techniques disclosed herein may be applied to other components of the gas turbine system 10 or other components generally (e.g., steam turbine components, automotive components, etc.). The external defect 64 of the gas turbine component 62 may be a recessed portion 66 (e.g., notch, groove, crack, gap, etc.). The external defect 64 may be a cosmetic defect (e.g., a defect in a non-load bearing portion of the hot gas component), such as a groove or notch in a base of the turbine nozzle 38 or turbine blade 46. In another embodiment, the external defect 64 may be a structural defect, such that the gas turbine component 62, at the external defect 64, may have minimum acceptable mechanical properties (e.g., tensile strength, etc.). The external defect 64 may be disposed on a surface 68 of the gas turbine component 62 that may interface with the hot gas during operation of the gas turbine system 10.

The gas turbine component 62 may include a hard-to-weld (HTW) material, such as iron-based, martensitic stainless steel, precipitated-hardening stainless steel, chromium molybdenum steel, high alloy steel, tool steel, non-ferrous alloys (e.g., aluminum, copper, brass, zinc, and zirconium), or some combination thereof. Further, HTW materials may be superalloys (e.g., nickel-based superalloys) having a high fraction of a "gamma prime" strengthening phase. Specifically, the HTW material may have a gamma-prime ($\gamma'$) between 0.4 and 1.0. In some embodiments, the HTW material may have a gamma-prime ($\gamma'$) between 0.6 and 0.9. In another embodiment, the HTW material may have a gamma-prime ($\gamma'$) between 0.7 and 0.8. A higher gamma-prime ($\gamma'$) fraction may increase the oxidization resistance and creep resistance of the HTW material, such that the gas turbine component 62 of the HTW material may operate in a high heat environment of the gas turbine system 10. In some embodiments, the HTW material may be a superalloy, such as Hastelloy, Inconel, Waspaloy, GTD, or Rene alloys. Examples of specific HTW materials include Rene 108, Rene N5, GTD 444, and GTD 111. In some embodiments, the HTW material may include cobalt, iron, niobium, tantalum, molybdenum, tungsten, vanadium, and titanium to strengthen the superalloy.

In another embodiment, the HTW material may be a nickel-base superalloy. Nickel-based superalloys can be classified into three categories: solid-solution strengthened, precipitated strengthened, and specialty alloys. Although, solid-solution strengthened nickel-base superalloys, such as Ni—Cu, Ni—Mo, Ni—Fe, Ni—Cr—Fe, Ni—Cr—Mo—W, Ni—Fe—Cr—Mo, Ni—Cr—Co—Mo (i.e., Inconel 625, Inconel 617, Haynes 230, etc.) are generally not considered HTW materials; however, the precipitation-strengthened and specialty nickel-base superalloys are generally considered HTW materials. Precipitation-strengthened nickel-base superalloys include titanium, aluminum, and/or niobium that forms a strengthening precipitate with nickel after an appropriate heat treatment. The gamma prime volume fraction of precipitation-strengthened nickel-base superalloys may range from less than 10% (e.g., Nimonic 263) to above 85% (e.g., Rene 195). For precipitation-strengthened nickel-base superalloys, if the gamma prime is less than 30% (e.g., GTD222 and Rene 41), it usually shows excellent weldability, such that the precipitation-strengthened nickel-base superalloy is an ETW material. However, if the gamma prime of the precipitation-strengthened nickel-base superalloy is above 30% in volume (e.g., Rene 108, Inconel 738, GTD111), it usually exhibits poor weldability, such that the precipitation-strengthened nickel-base superalloy is a HTW superalloys. Thus, the gas turbine component 62 in the hot gas path may be made with HTW materials, such as Rene 108, Inconel 738, GTD111. Specialty alloys generally include nickel-aluminum intermetallics and Oxide dispersion strengthened alloys. Examples of specialty alloys include oxide dispersion strengthened alloys (e.g., MS6000, MA754), and nickel-aluminides (e.g., NiAl or Ni3Al compound). Specialty alloys generally have high strength and corrosion resistance, and are considered a HTW material because of their low ductility at high temperatures (e.g., high temperature creep strength). Accordingly, the gas turbine component 62 may be made of a specialty alloy.

As discussed above, the external defect 64 may be disposed on a surface 68 of the gas turbine component 62 that may interface with the hot gas during operation of the gas turbine system 10. A braze material 70 may be applied to the external defect 64 of the gas turbine component 62. In the illustrated embodiment, the braze material 70 may be inserted into the recessed portion 66 (e.g., on a recessed surface 72 of the recessed portion 66). However, in some embodiments, the braze material may be disposed on the gas turbine component 62 to create a protrusion, or other missing feature, to repair a defect in the gas turbine component 62 caused by a lack of material. The braze material 70 may be a tape having a thickness 74 between 0.00254 and 1.524 mm (e.g., 0.1 and 60 mil). The tape of the braze material 70 may be placed on 50-100%, 60-95%, and/or 75-90% of the recessed surface 72. In some embodiments, the braze material 70 may be a powder, foil, or pre-form that may be positioned at least partially within the recessed portion 66. The braze material 70 may be configured to fill the recessed portion 66 up to or beyond the surface 68 of the gas turbine component 62. In some embodiments, the braze material 70 may be configured to only partially fill the recessed portion 66.

Additionally, a plate 76 may be disposed over the recessed portion 66 and the braze material 70 such that the braze material 70 is disposed between the recessed surface 72 and an inner surface 78 of the plate. As discussed below, heat may be applied to an outer surface 96 of the plate 76 to heat the braze material 70 and bond the plate 76 with the gas turbine component 62 having an external defect 64 and the plate 76. In some embodiments, heat may be applied to the outer surface 96 of the plate 76 via application of a filler material to the outer surface 96 of the plate.

In some embodiments, the plate 76 is configured to fully cover the recessed portion 66. As such, the inner surface 78 of the plate may have a larger surface area than an area spanning across the recessed portion 66. However, in some embodiments, the external defect 64 may have a non-uniform shape. Thus, the dimensions of the plate 76 may be configured such that the inner surface 78 of the plate fully covers the recessed portion 66. For example, the plate 76 may have a rectangular shape. A length 80 of the plate 76 may be longer than an overall longest distance across the recessed portion 82, and a width of the plate may be longer than a longest distance across the recessed portion in a direction orthogonal to the overall longest distance across the recessed portion. Thus, the plate 76 may fully cover the recessed portion 66 having a non-uniform shape. The plate 76 may have any shape suitable for covering the recessed portion 66. In some embodiments, the plate 76 may be formed having a shape based on the shape of the recessed portion 66. That is, the plate 76 may be formed with a complementary shape to the recessed portion 66. Further, the plate 76 may fully cover the braze material 70.

In some embodiments, the plate 76 may be configured to be larger than the recessed portion 66 by a predetermined amount such that the plate 76 has an excess portion 84 (e.g., portions of the plate extending beyond the recessed portion 66). In some embodiments, the plate 76 may be configured to have at least a minimum amount of excess portion 84 along a perimeter of the recessed portion 66. For example, the plate 76 may extend at least 1 to 10 mm, 1 to 5 mm, or 1 to 3 mm beyond the recessed portion 66. In some embodiments, the excess portion 84 extends beyond both the recessed portion 66 and the braze material 70. The excess portion 84 of the plate 76 may be used as a weld run-on or run-off tabs for starting or stopping a weld respectively.

In some embodiments, portions of the inner surface 78 of the plate may contact an exterior surface 86 of the gas turbine component 62. In another embodiment, the thickness 84 of the braze material 70 (i.e., before or after application of the filler material to melt the braze material) may be greater than a depth 88 of the recessed portion 66 such that portions of the plate 76 may rest on the braze material 70 and not contact the exterior surface 86 of the gas turbine component 62 upon disposing the plate 76 above the recessed portion 66. If a surface 90 of the braze material 70 is uneven, the plate 76 may shift with respect to the recessed portion 66 and/or the braze material 70. Accordingly, in some embodiments, to prevent shifting, the plate 76 may be fixed to the gas turbine component before applying the filler material to the outer surface 96.

The plate 76 may include an easy-to-weld (ETW) material. The ETW material may include, but is not limited to steel, stainless steel, nickel-based superalloy, cobalt-based superalloy, or another suitable metallic material. Examples of specific ETW materials include solid-solution strengthened alloys, such as Inconel 625, Inconel 617, Haynes 230, and precipitated strengthened alloys, such as GTD222, GTD262, GTD292, Rene 41. In some embodiments, the ETW alloys in the precipitated strengthened alloy category have a gamma prime (γ') less than 40%. In another embodiment, the ETW has a gamma prime (γ') less than 20%.

Figure 3:
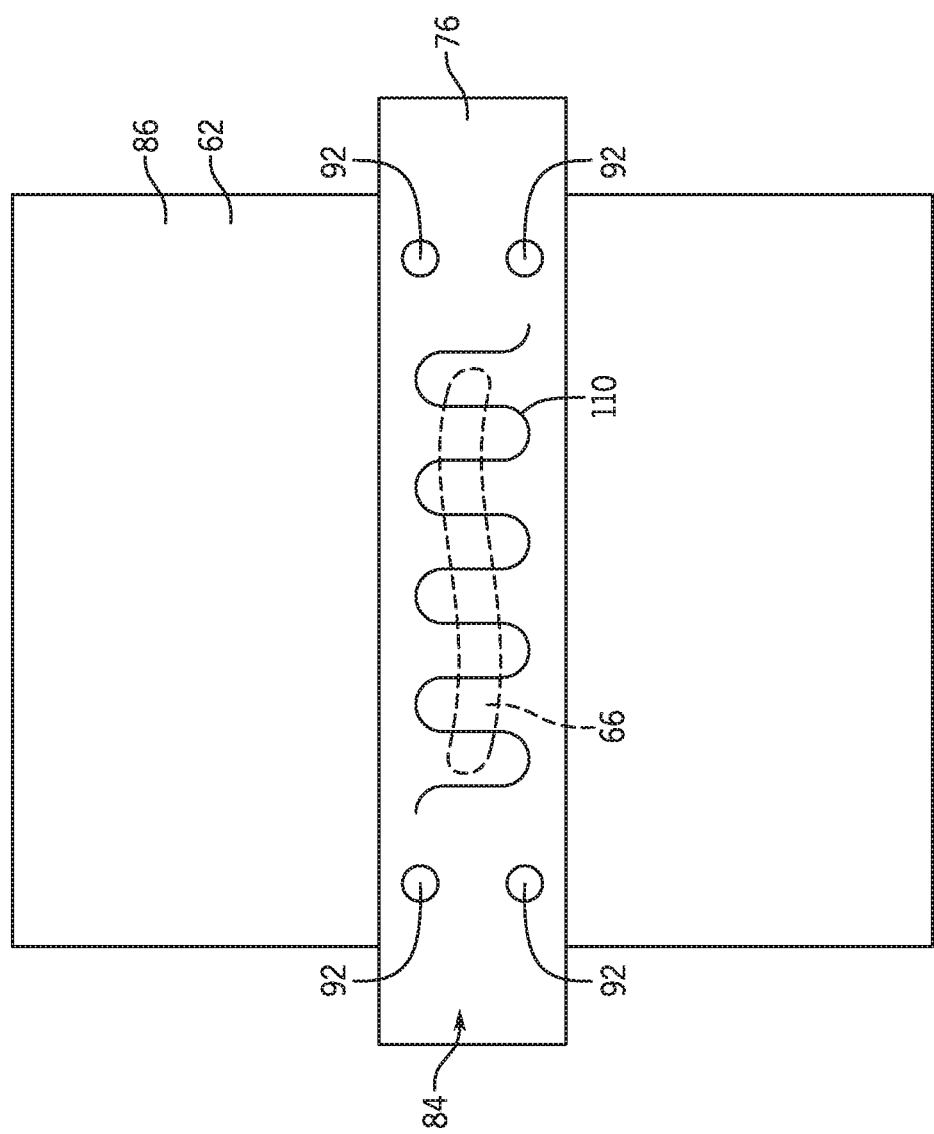
FIG. 3 is a top view of an embodiment of a plate disposed on the gas turbine component.

FIG. 3 is a top view of an embodiment of a gas turbine component 62 and the plate 76. A filler material may be applied to an outer surface 96 of the plate 76 along a weld path 110 to heat the braze material and bond the plate 76 with the gas turbine component 62 having an exterior defect and the plate 76. The weld path 110 may direct the filler material to be applied as parallel weld beads. In some embodiments, the weld path 110 may direct the filler material to be applied, such that the weld beads are overlapped or separated on the outer surface 96 of the plate 76. The weld path 110 may direct the filler material to be applied in various patterns. The filler material may be applied to a portion of the plate 76 disposed above the recessed portion 66. In some embodiments, the filler material is applied to both the portion of the plate 76 disposed above the recessed portion 66 and to the excess portion 84 of the plate 76. In another embodiment, the filler material is only applied to a portion of the plate 76 disposed above the braze material.

In some embodiments, the plate 76 and the gas turbine component 62 are fixed together before applying the filler material to the outer surface 96. The plate 76 and gas turbine component 62 may be fixed together at locations 92 via at least one weld, adhesive, clamping device, or other suitable mechanism for securing the plate 76 and brazing material to the gas turbine component 62. In some embodiments, the plate 76 and turbine component 62 may be fixed together using fusion and/or resistance weld processes. The weld process may weld the components together at locations 92. However, in another embodiment, the weld process is configured to melt the braze material, disposed between the plate 76 and the gas turbine component 62, at locations 92 to fix the plate 76 to the gas turbine component 62. The plate 76 may be fixed to the exterior surface 86 of the gas turbine component 62, such that the weld 92 is not applied above the recessed portion 66. Fixing the plate 76 and gas turbine component 62 together may decrease shifting and rotating, as well as increase heat conduction between at least the plate 76 and the braze material 70.

Figure 4:
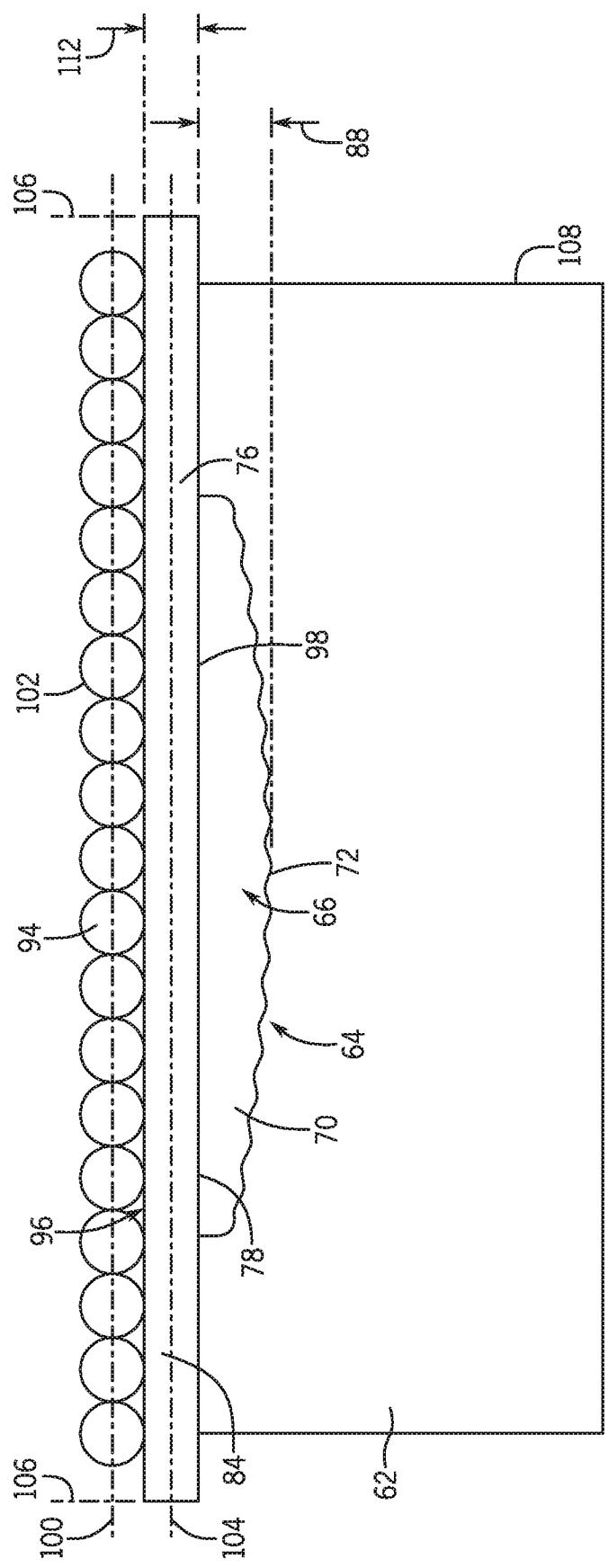
FIG. 4 is a cross-sectional view of an embodiment of a gas turbine component with a filler material applied to a plate to bond the plate with the gas turbine component via a braze material.

FIG. 4 a cross-sectional view of an embodiment of a filler material 94 applied to an outer surface 96 of the plate 76 to heat the braze material 70 and bond the plate 76 with the gas turbine component 62 having an exterior defect and the plate 76. The plate 76 is disposed over the recessed portion 66 and the braze material 70 such that the braze material 70 is disposed between the recessed surface 72 and the inner surface 78 of the plate 76. At least a first portion of the inner surface 78 of the plate 76 is in contact the braze material 70, and the braze material 70 is in contact with the recessed surface 72 of the recessed portion 66.

The filler material 94 may be applied to the outer surface 96 of the plate 76. The application of filler material 94 to the plate 76 heats the plate 76, which heats the braze material 70. Placement of the filler material 94 may be dependent on the size of the external defect 64 (e.g., depth 88 and breadth of the recessed portion 66). For example, the recessed portion 66 may be a long and narrow groove that has a shallow end and a deep end. As such, more braze material 70 may be applied to the deep end. Thus, more filler material 94 may be applied to the plate 76 above the deep end than to the plate 76 above the shallow end to melt the braze material 70 in both the deep end and the shallow end.

The filler material 94 may be applied to the outer surface 96 of the plate 76 via a welding process. The welding process may be a tungsten inert gas (TIG), metal inert gas (MIG), stick, laser, electron beam (EB), plasma, flux-cored arc welding (FCAW), laser beam (LB) fusion welding, another type of suitable welding process, or some combination thereof. A shielding gas may be used during application of the filler material 94 to prevent oxidation. Application of the filler material 94 to the outer surface 96 of the plate 76 heats the plate 76. The application of the filler material 94 and a thickness 112 of the plate 76 are configured to heat the braze material 70 to the brazing temperature. Although the plate 76 is disposed between the braze material 70 and the filler material 94, the filler material 94 may be heated prior to or during application to the plate 76. Heat from the filler material 94 may be conducted from the filler material 94, through the plate 76, and to the braze material 70. The thickness 112 of the plate 76 may affect heating of the braze material (e.g., the braze material 70 may not melt if the thickness 112 of the plate 76 is too thick). The thickness 112 of the plate 76 may be between 0.1 mm to 10 mm. Additionally, heat from the filler material 94 may be radiated to the braze material 70.

The heat transferred from the filler material 94, via conduction and/or radiation, to the braze material 70 may be sufficient to liquefy (e.g., melt) the braze material 70. The filler material applied to the outer surface of the plate may have a temperature of 1648 degrees Celsius (3000 degrees Fahrenheit). The plate 76 may be heated such that a temperature at an interface 98 between the plate 76 and the braze material 70 has a temperature above the liquidus temperature of the braze material. In some embodiments, the braze material 70 has a liquidus temperature between 982 and 1287 degrees Celsius (1800 and 2350 degrees Fahrenheit). Thus, the heat transferred to the braze material 70 from the filler material 94 via the plate 76 may heat the plate 76 at the interface 98 to a temperature above 1287 degrees Celsius, such that the braze material 70 melts. After the filler material 94 cools and the temperature of the braze material 70 falls below the liquidus temperature of the braze material 70, the braze material 70 will solidify. Heating the braze material 70 above the liquidus temperature, then cooling the braze material 70 below the liquidus temperature is configured to trigger a bonding process for the braze material 70. The bonding process includes the braze material 70 bonding with the gas turbine component 62 and the plate 76 during liquefaction and re-solidification of the braze material 70.

The braze material 70 is indirectly heated via application of the filler material 94 to the plate 76, thereby enabling the plate 76 to be brazed with the gas turbine component 62 without putting the gas turbine component 62 in a furnace (e.g., vacuum furnace). Although brazing typically uses a vacuum furnace to perform a brazing process without formation of oxidation, the bonding process disclosed herein does not use a vacuum furnace. The plate 76 is configured to cover the recessed portion 66 and the braze material 70, and during the bond process, the braze material 70 is configured to liquefy between the plate 76 and the recessed portion 66 such that oxidation does not occur. Thus, the bonding process may be accomplished without specialized brazing equipment, such as a furnace or a gas flame torch.

In some embodiments, the application of the filler material 94 to the outer surface 96 of the plate 76 is configured to heat the braze material 70 to the brazing temperature without heating the gas turbine component 62 above a heat threshold. The heat threshold may be dependent on the material properties of the gas turbine component 62. The heat threshold may be a maximum temperature that a material of the gas turbine component 62 may be heated before altering the microstructure of the material to an extent that the gas turbine component 62 is unsuitable for its intended use without being heat treated. If the temperature of the gas turbine component 62 exceeds the heat threshold, heat treating the gas turbine component 62 may restore the material of the gas turbine component 62 to a desired microstructure for its intended use, but heat treating may be time consuming and costly.

In some embodiments, a portion of the filler material 94 is removed after the bonding process is complete. For example, the filler material 94 may be removed above a line

100. A portion of the filler material 94 removed may be fifty percent or more of the filler material 94 applied to the outer surface 96 of the plate 76. A surface 102 of the filler material 94 may be rough or uneven. Machining the filler material to the line 100 may smooth the surface of the filler material 94. Machining the filler material to the line 100 may also remove cracks or other imperfections, which may prevent crack propagation. In some embodiments, the filler material 94 is removed and a portion of the plate 76 is removed via machining of the plate to a line 104. In some embodiments, the filler material 94, plate 76, and/or braze material 70 may be machined to be even with the exterior surface 86 of the gas turbine component 62 and to restore the gas turbine component 62 to manufactured dimensions. That is, the line 100 or the line 104 may be even (e.g., coplanar) with the exterior surface 86. In some embodiments, a portion of the filler material 94 and/or the plate 76 may extend beyond an edge 108 of the gas turbine component. The portion of the filler material 94 and/or the plate 76 extending beyond the edge 108 of the gas turbine component 62 may be removed via machining to the line 106.

The filler material 94 may include either an ETW material, a HTW material, or some combination thereof. In some embodiments, the filler material 94 is an ETW material when the filler material 94 is configured to be removed after application via a machining process. Although HTW material may have preferable mechanical properties, ETW filler material may be easier and/or cheaper to apply to the plate 76 than HTW filler material. Further, the ETW filler material may be easier to obtain a defect-free weld than the HTW filler material. Accordingly, the ETW material may be used when the filler material 94 is configured to be fully removed because the preferable mechanical properties of the HTW material may only increase the difficulty in removing the filler material 94. However, in some embodiments, the filler material 94 may include ETW material when a portion of the filler material 94 is configured to remain on the gas turbine component 62 after machining. In other embodiments, the filler material 94 may include a HTW material when at least a portion of the filler material 94 is configured to remain on the gas turbine component 62 after machining to increase oxidation resistance, temperature corrosion, creep resistance, and or mechanical strength of the filler material 94.

Figure 5:
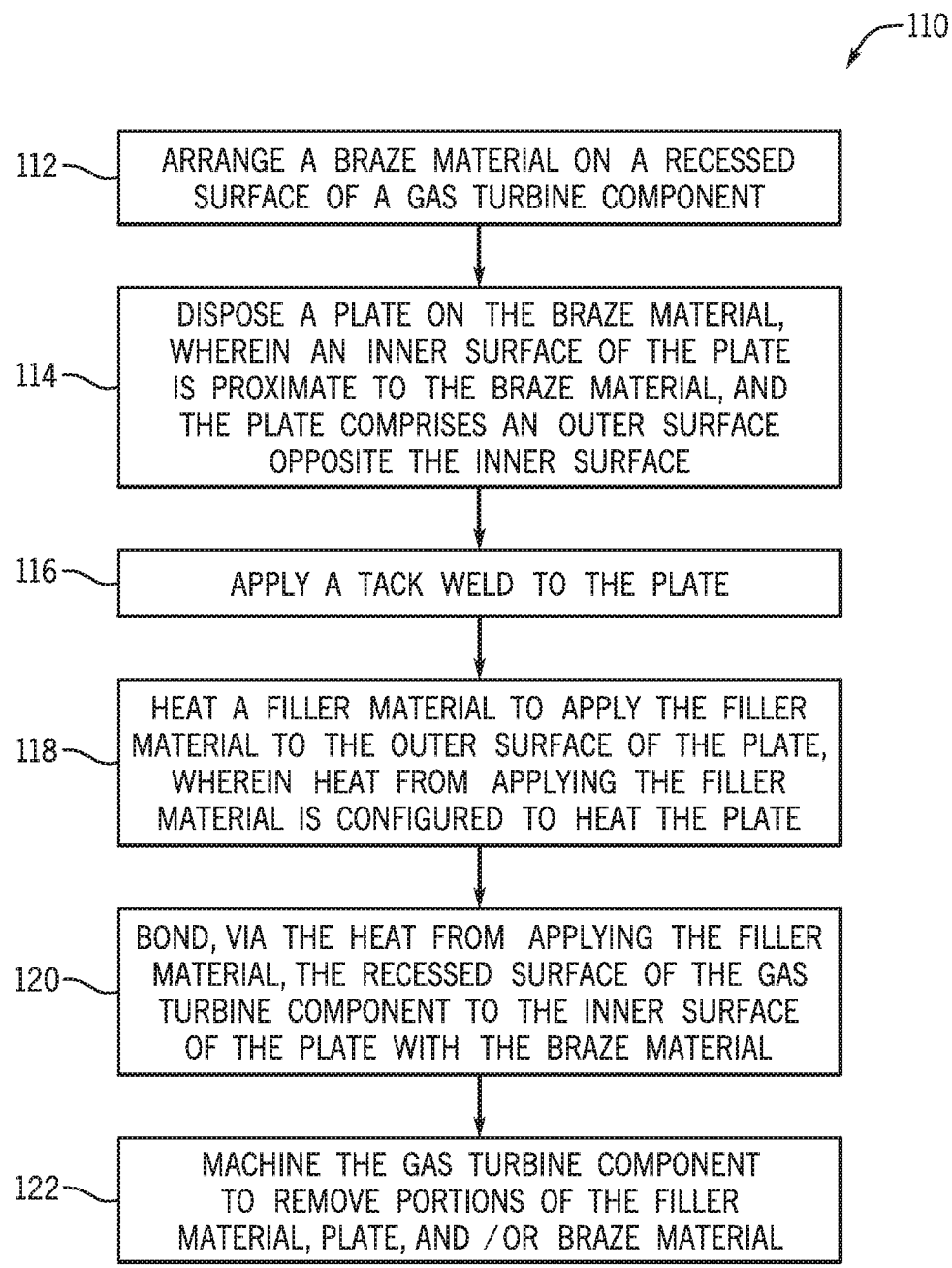
FIG. 5 is a flow diagram of an embodiment of a method for performing a weld-braze.

FIG. 5 illustrates an embodiment of a method 110 suitable for performing a weld-braze, as described above with respect to FIGS. 2-4. The method includes arranging (block 112) a braze material on a recessed surface of a recessed portion of a gas turbine component. The braze material may be a powder, foil, tape, or pre-form. For example, an operator may fill the recessed portion with powder braze material. The operator may partially fill the recessed portion. However, the operator may completely fill or overfill the recessed portion with the braze material. In some embodiments, the operator may arrange the braze material on the external surface of the gas turbine component in addition to the recessed surface.

The method also includes disposing (block 114) a plate on the braze material, such that an inner surface of the plate is proximate to the braze material. The plate may be disposed above the recessed portion. In some embodiments, the plate is disposed partially within the recessed portion and above the braze material such that the braze material is positioned between the recessed surface and the plate. In another embodiment, the plate is disposed entirely within the recess portion. The plate may be substantially the same size as an opening of the recessed portion, such that the plate spans across the recessed portion. In some embodiments, the method includes the step of applying (block 116) a tack weld to the plate prior to heating the filler material to apply the filler material. The tack weld may be configured to hold the plate in place while applying the filler material as described below.

As described above, the plate has an outer surface opposite the inner surface. The method further includes heating (block 118) a filler material to apply the filler material to the outer surface of the plate. The heat from the applied filler material is configured to heat the plate and the braze material. Moreover, the method includes bonding (block 120), via the heat from applying the filler material, the recessed surface of the gas turbine component to the inner surface of the plate with the braze material. Heat from the filler material may be transferred through the plate to heat the braze material to a temperature above the liquidus temperature of the braze material such that the braze material melts. As the heat applied from the filler material dissipates, the braze material cools and solidifies. Melting then solidifying the braze material, while the braze material is in contact with both the recessed surface and the plate may cause bonding (block 120) of the braze material to both the recessed surface and the plate.

In some embodiments, the method further includes machining (block 122) the gas turbine component to remove portions of the filler material, plate, braze material, or some combination thereof. However, the method does not include the step of heat treating the gas turbine component and/or the braze material in a furnace, vacuum furnace, etc.

The technical effects of the weld-brazing techniques disclosed herein include enabling faster repairs at a reduced cost by eliminating steps of a traditional brazing process, as well as providing improved repairs to load-bearing components having hard-to-weld materials.

This written description uses examples to disclose the embodiments of the present disclosure, including the best mode, and also to enable any person skilled in the art to practice the embodiments of the present disclosure, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a gas turbine component comprising a recessed portion with a recessed surface, and an exterior surface disposed about the recessed portion;
   a plate disposed over the recessed portion and at least a first portion of the exterior surface, wherein the plate comprises an outer perimeter, an outer surface and an inner surface, the plate comprises a plate material that is easier to weld than a component material of the gas turbine component, and the inner surface faces the recessed portion and the first portion of the exterior surface;
   a braze material disposed within the recessed portion and extending an entire distance between the recessed surface and the inner surface of the plate, wherein the braze material bonds the recessed surface of the recessed portion with the inner surface of the plate; and
   a metallic weld filler material disposed along a weld path within the outer perimeter on the outer surface of the plate disposed over the recessed portion, wherein the plate completely separates all of the metallic weld filler material on the outer surface of the plate from the gas turbine component, and the metallic weld filler material is oriented directly above the braze material disposed within the recessed portion.

2. The system of claim 1, wherein the metallic weld filler material is welded to the outer surface of the plate above a recess area of the recessed portion, and the metallic weld filler material is welded along the weld path in a weld pattern having a plurality of weld beads oriented directly above the braze material disposed within the recessed portion.

3. The system of claim 1, wherein the gas turbine component comprises a hot-gas-path component for a gas turbine.

4. The system of claim 1, wherein an area of the plate is greater than a recess area of the recessed portion of the gas turbine component, wherein the area of the plate is predetermined when the plate is pre-formed separate from the gas turbine component.

5. The system of claim 1, wherein the component material of the gas turbine component comprises a hard-to-weld material comprising at least one of an iron-based, martensitic stainless steel, a precipitated-hardening stainless steel, a chromium molybdenum steel, a high alloy steel, a tool steel, a non-ferrous alloy, a superalloy having a gamma-prime ($\gamma'$) between 0.4 and 1.0, a nickel-based superalloy, Hastelloy, Inconel, Waspaloy, GTD alloy, Rene alloy, nickel-aluminum intermetallics, and Oxide dispersion strengthened alloys.

6. The system of claim 5, wherein the plate material of the plate comprises an easy-to-weld material comprising at least one of a steel, a stainless steel, a nickel-based superalloy different than the hard-to-weld material, a cobalt-based superalloy, a solid-solution strengthened alloy, Inconel 625, Inconel 617, Haynes 230, a precipitated strengthened alloy, GTD222, GTD262, GTD292, Rene 41, or an alloy having a gamma prime ($\gamma'$) less than 40 percent.

7. The system of claim 1, wherein the gas turbine component comprises a machined surface extending at least partially into the metallic weld filler material on the plate.

8. The system of claim 1, comprising a brazed joint of the braze material along the inner surface of the plate across an entire area of the recessed portion.

9. The system of claim 1, wherein the braze material completely fills the recessed portion.

10. The system of claim 1, wherein a second portion of the exterior surface is disposed directly about the first portion of the exterior surface directly adjacent to the plate, wherein the second portion extends flush with the first portion or the second portion extends below the first portion and the inner surface of the plate.

11. The system of claim 10, wherein the metallic weld filler material protrudes above the outer surface of the plate and above the first and second portions of the exterior surface.

12. The system of claim 1, wherein the plate completely separates the metallic weld filler material from the braze material, wherein the metallic weld filler material extends over only a portion of the outer surface of the plate.

13. A system, comprising:
a turbomachinery component comprising a defect and an exterior surface disposed about the defect;
a plate disposed over the defect and at least a first portion of the exterior surface, wherein the plate comprises an outer perimeter, an outer surface and an inner surface, and the inner surface faces the defect and the first portion of the exterior surface;
a braze material disposed over the defect and extending an entire distance between the defect and the inner surface of the plate, wherein the braze material bonds the defect with the inner surface of the plate; and
a metallic weld filler material disposed along a weld path within the outer perimeter on the outer surface of the plate disposed over the defect, wherein the plate completely separates all of the metallic weld filler material on the outer surface of the plate from the turbomachinery component, and the metallic weld filler material is oriented directly above the braze material disposed over the defect.

14. The system of claim 13, wherein the defect comprises a recessed portion, and the weld path comprises a weld pattern.

15. The system of claim 13, wherein a second portion of the exterior surface is disposed directly about the first portion of the exterior surface directly adjacent to the plate, and the second portion extends flush with the first portion or the second portion extends below the first portion.

* * * * *